(12) United States Patent
Yagyu et al.

(10) Patent No.: US 7,373,114 B2
(45) Date of Patent: May 13, 2008

(54) SIGNAL TRANSMISSION CIRCUIT, SIGNAL OUTPUT CIRCUIT AND TERMINATION METHOD OF SIGNAL TRANSMISSION CIRCUIT

(75) Inventors: Masayoshi Yagyu, Hanno (JP); Hiroki Yamashita, Hachioji (JP); Fumio Yuuki, Kamifukuoka (JP); Tatsuya Kawashimo, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 555 days.

(21) Appl. No.: 11/030,063

(22) Filed: Jan. 7, 2005

(65) Prior Publication Data
US 2005/0208902 A1    Sep. 22, 2005

(30) Foreign Application Priority Data
Mar. 19, 2004 (JP) ............................. 2004-080172

(51) Int. Cl.
*H04B 1/44* (2006.01)
(52) U.S. Cl. .................. 455/78; 455/114.2; 455/114.3; 455/324; 455/80; 327/538; 327/333; 327/540; 375/212; 375/220; 375/257; 315/244
(58) Field of Classification Search .................. 455/78, 455/114.2, 114.3, 80, 324; 375/212, 220, 375/257; 315/244
See application file for complete search history.

(56) References Cited

U.S. PATENT DOCUMENTS

| | | | | |
|---|---|---|---|---|
| 3,718,762 A | * | 2/1973 | Nezu et al. .................. 375/257 |
| 5,451,861 A | * | 9/1995 | Giebel ......................... 323/315 |
| 5,534,812 A | * | 7/1996 | Cao et al. .................... 327/333 |
| 5,898,326 A | * | 4/1999 | Okayasu ..................... 327/112 |
| 5,999,041 A | * | 12/1999 | Nagata et al. .............. 327/538 |
| 6,009,000 A | * | 12/1999 | Siri .......................... 363/21.09 |
| 6,160,423 A | * | 12/2000 | Haq ............................. 327/41 |
| 6,313,677 B1 | * | 11/2001 | Okayasu ..................... 327/170 |
| 6,449,308 B1 | * | 9/2002 | Knight et al. ............... 375/212 |
| 6,812,767 B2 | * | 11/2004 | Haq ........................... 327/333 |
| 6,822,267 B1 | * | 11/2004 | Okayasu ...................... 257/92 |
| 6,845,126 B2 | * | 1/2005 | Dent et al. .................. 375/219 |

(Continued)

FOREIGN PATENT DOCUMENTS

JP    2-177722    7/1990

(Continued)

*Primary Examiner*—Marceau Milord
(74) *Attorney, Agent, or Firm*—Mattingly, Stanger, Malur & Brundidge, P.C.

(57) ABSTRACT

This invention provides a signal transmission circuit, a signal output circuit, and a termination method of a signal transmission circuit capable of preventing the re-reflection of the signal at a transmitting node of a transmission path even when an impedance of a signal output circuit does not match a characteristic impedance of a transmission path. On a signal transmission circuit composed of a transmission path, a signal output circuit connected to a transmitting node of the transmission path, and a signal receiver circuit connected to a receiving node of the signal transmission path, in order to prevent the re-reflection of an output signal of a signal output unit at the transmitting node via the receiving node, a correction current generator unit is provided for outputting correction current with a predetermined current amount and at a predetermined timing set in a current amount/timing control section, to the transmitting node.

14 Claims, 8 Drawing Sheets

U.S. PATENT DOCUMENTS

6,946,868 B2 * 9/2005 Svensson et al. ............ 326/30

FOREIGN PATENT DOCUMENTS

| | | |
|---|---|---|
| JP | 4-207224 | 7/1992 |
| JP | 5-276004 | 10/1993 |
| JP | 11-345054 | 12/1999 |
| JP | 2003-8423 | 1/2003 |

* cited by examiner

*FIG. 1*

10 : SIGNAL OUTPUT CIRCUIT  11 : TRANSMISSION PATH  12 : SIGNAL RECEIVER CIRCUIT

70 : SIGNAL OUTPUT CIRCUIT    71 : TRANSMISSION PATH    72 : SIGNAL RECEIVER CIRCUIT

SIGNAL TRANSMISSION CIRCUIT, SIGNAL OUTPUT CIRCUIT AND TERMINATION METHOD OF SIGNAL TRANSMISSION CIRCUIT

CROSS-REFERENCE TO RELATED APPLICATION

The present application claims priority from Japanese Patent Application JP 2004-080172 filed on Mar. 19, 2004, the content of which is hereby incorporated by reference into this application.

TECHNICAL FIELD OF THE INVENTION

The present invention relates to a signal transmission circuit, a signal output circuit, and a termination method of a signal transmission circuit. More particularly, the present invention relates to a technique effectively applied to a signal transmission circuit, a signal output circuit, and a termination method of a signal transmission circuit capable of preventing the re-reflection of a signal waveform.

BACKGROUND OF THE INVENTION

According to the examination by the inventors of the present invention, the techniques as follows are known as the technique for improving the waveform quality of a signal.

For example, Japanese Patent Application Laid-Open No. 4-207224 discloses an output circuit which enables the signal transmission, in which impedance matching between the output circuit and a transmission path is achieved. The configuration of the circuit includes a MOS transistor in an output stage, a MOS transistor and a current source combined with the MOS transistor in an output stage to form a current mirror circuit, and the like. More specifically, this output circuit sets an output impedance by passing a predetermined bias current to the MOS transistor in an output stage by the use of a current mirror circuit so as to achieve the impedance matching between the output circuit and the transmission path.

Also, Japanese Patent Application Laid-Open No. 5-276004 discloses an output circuit capable of reducing the ringing in an output waveform. The configuration of the circuit includes an output driver circuit, voltage control means connected to a transmission terminal of the output driver circuit, and the like. The output driver circuit has a driving capability corresponding to the transient state period of a signal, and the voltage control means has a function to switch the output resistance by a plurality of damping resistors. More specifically, this output circuit is designed to reduce the ringing in an output waveform by optimally controlling the driving capability and the damping resistors.

Also, Japanese Patent Application Laid-Open No. 11-345054 discloses a driver circuit for signal transmission capable of preventing the waveform distortion. The configuration of the circuit includes an output driver, a front-stage driver for driving the output driver, means for adjusting the output level of the front-stage driver, and the like. More specifically, this driver circuit is characterized in that the output level is emphasized in advance in an output stage so as to cope with the attenuation of the high-frequency components in a transmission path.

Also, Japanese Patent Application Laid-Open No. 2003-8423 discloses a bus interface circuit capable of reducing the distortion in a signal waveform. The configuration of the circuit includes a circuit for detecting the change of a signal in a connector terminal to a bus, a circuit for driving the connector terminal in a direction identical to the direction of the change in accordance with the detected change of a signal, and the like. More specifically, this bus interface circuit is designed to operate so that the voltage level on a bus can always be the same level as the voltage level of the connector terminal, thereby preventing the influence of the connector terminal on the signal transmitted on the bus.

Also, Japanese Patent Application Laid-Open No. 2-177722 discloses an output circuit for reducing the output noise. This output circuit is provided with two output circuits of the same configuration, and the ringing in output potential and the like are reduced by operating the two circuits alternately.

SUMMARY OF THE INVENTION

By the way, as a result of the examination by the inventors of the present invention on the technique for improving the waveform quality of a signal, the following facts have been revealed.

Figure 7:
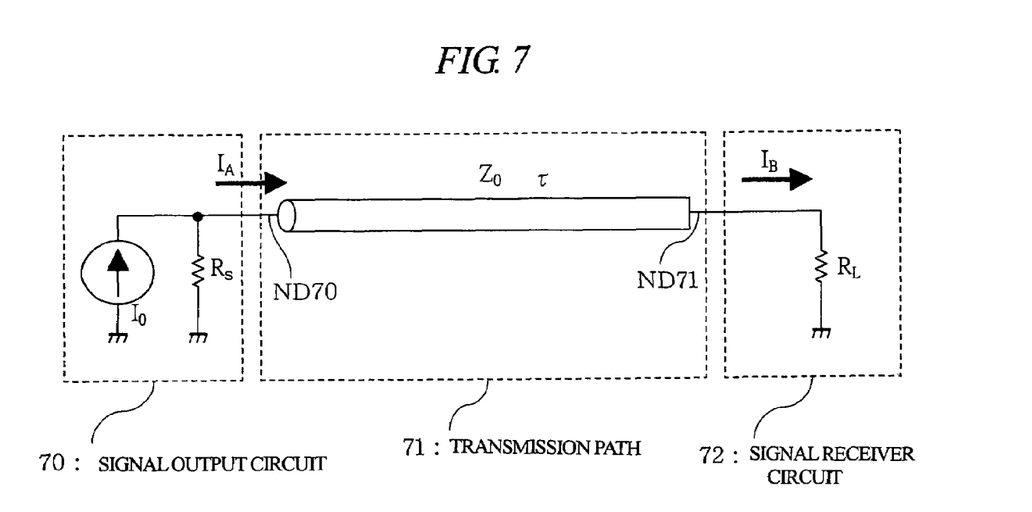
FIG. 7 is a diagram of an equivalent circuit representing an example of a circuit configuration of a signal transmission circuit in the conventional technique examined as a premise of the present invention.

For example, as a basic technique for improving the waveform quality of a signal, the impedance matching is known. The impedance matching will be described with using a transmission circuit shown in FIG. 7 as an example. FIG. 7 shows an equivalent circuit representing an example of a circuit configuration of a signal transmission circuit in the conventional technique examined as a premise of the present invention. FIG. 8 is a current waveform diagram showing an example of an operation waveform of the signal transmission circuit of FIG. 7 in the conventional technique examined as a premise of the present invention, in which FIG. 8A shows the case of Rs>Zo, FIG. 8B shows the case of Rs<Zo, and FIG. 8C shows the case of Rs=Zo.

The signal transmission circuit shown in FIG. 7 is composed of a signal output circuit 70 having an impedance $R_S$ and outputting a current signal $I_O$, a transmission path 71 having a characteristic impedance $Z_O$ and a transmission delay time $\tau$ and transmitting the current signal of the signal output circuit 70, and a signal receiver circuit 72 having an impedance $R_L$ and receiving the current signal passing through the transmission path 71. For the simplification of the description, the signal transmission circuit is assumed to be, for example, a write circuit in a magnetic storage device. In this case, the write current signal outputted from the signal output circuit 70 is received by a magnetic head functioning as the signal receiver circuit 72 via the transmission path 71.

In the data writing operation using a magnetic head, the impedance $R_L$ of the magnetic head is usually lower than the characteristic impedance $Z_O$ of the transmission path 71. Therefore, reflection of the current signal occurs at a receiving node ND71 of the transmission path 71. The reflected current signal is returned to the signal output circuit 70 via the transmission path 71. In this event, if the impedance $R_S$ of the signal output circuit 70 matches the characteristic impedance $Z_O$ of the transmission path 71, re-reflection does not occur at a transmitting node ND70 of the transmission path 71 and the write current signal $I_B$ can be stably supplied to the magnetic head as shown in FIG. 8C.

Figure 8A:
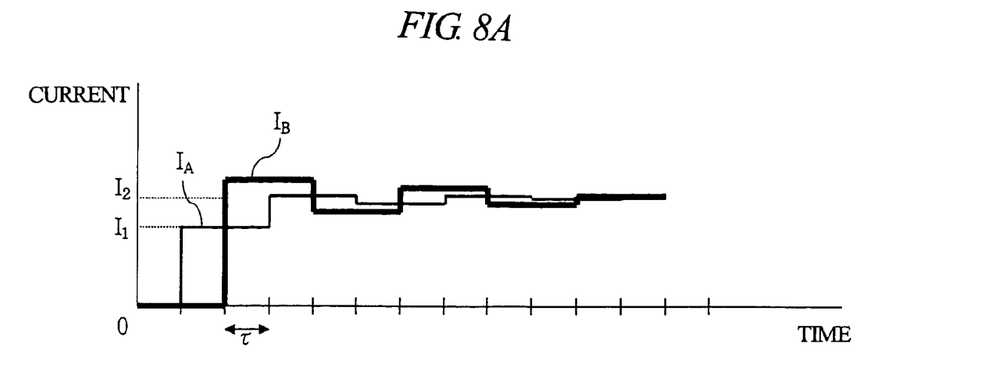
FIG. 8A shows the case of Rs>Zo.
Figure 8B:
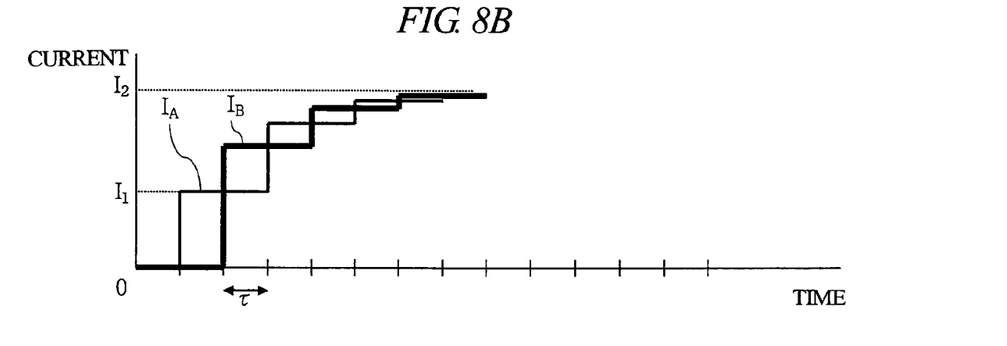
FIG. 8B shows the case of Rs<Zo.
Figure 8C:
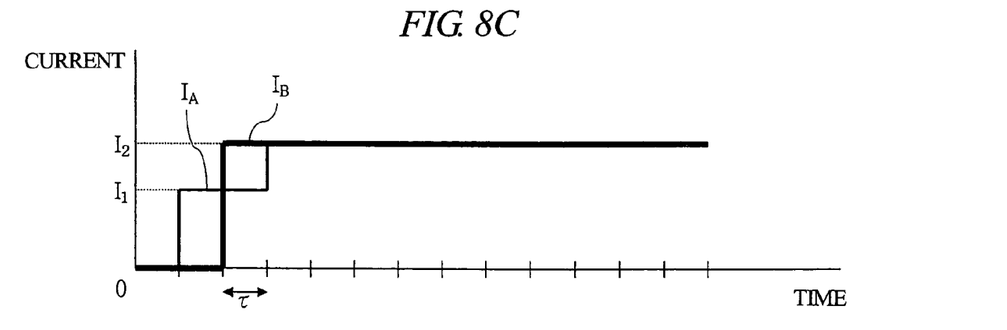
FIG. 8C shows the case of Rs=Zo.

On the other hand, if the impedances do not match, that is, in the case of $R_S > Z_O$ or $R_S < Z_O$, the re-reflection occurs at a transmitting node ND70 of the signal output circuit 70 and the distorted write current signal $I_B$ is supplied to the magnetic head as shown in FIGS. 8A and 8B. In this case, problems occur such as error while writing data by the magnetic head and data write time extension due to the unstable write current signal.

For this reason, when establishing the signal transmission circuit, it is necessary to adjust the impedance $R_S$ of the signal output circuit 70 to match the characteristic impedance $Z_O$ of the transmission path 71. Therefore, in the conventional technique, the design method capable of adjusting the impedance $R_S$ of the signal output circuit 70 to match the characteristic impedance $Z_O$ of the transmission path 71 is used when designing the signal output circuit 70.

However, in the method mentioned above, it is necessary to redesign the signal output circuit 70 in order to change the impedance thereof when the designed signal output circuit 70 is applied to another transmission path 71 having different impedance. More specifically, since it is necessary to prepare the signal output circuits 70 suitable for the transmission paths 71 each having different characteristic impedances, the number of process steps, the design cost, and the manufacturing cost are increased.

For its solution, an object of the present invention is to provide a signal transmission circuit, a signal output circuit, and a termination method of a signal transmission circuit capable of preventing the re-reflection of the signal at a transmitting node of a transmission path even when an impedance of a signal output circuit does not match a characteristic impedance of a transmission path.

The above and other objects and novel characteristics of the present invention will be apparent from the description and the accompanying drawings of this specification.

The typical ones of the inventions disclosed in this application will be briefly described as follows.

The signal transmission circuit according to the present invention is composed of a transmission path, a signal output circuit connected to a transmitting node of the transmission path, and a signal receiver circuit connected to a receiving node of the transmission path, and means for outputting correction current with a predetermined current amount at a predetermined timing to a transmitting node is provided in order to prevent the re-reflection of the output signal of the signal output circuit at a transmitting node, which has been reflected at a receiving node.

In this case, the above-mentioned predetermined current amount is the current amount for canceling the current amount generated by the re-reflection, and the above-mentioned predetermined timing is the timing at which the re-reflection of the output signal of the signal output circuit occurs at the transmitting node. In this manner, since the re-reflection at the transmitting node does not occur, the ringing in a signal waveform at the receiving node can be prevented.

Also, the means for outputting the correction current has, for example, a first setting terminal and a function to optionally change the current amount in accordance with the setting value of the first setting terminal. Similarly, the means for outputting the correction current has, for example, a second setting terminal and a function to optionally change the timing in accordance with the setting value of the second setting terminal.

More specifically, by setting the optimum current amount and timing of the correction current in accordance with the characteristics of the signal transmission circuit, the re-reflection can be prevented without changing the design of the circuit even when the characteristics of the signal transmission circuit are changed.

In addition, the above-mentioned function to optionally change the timing has, for example, a first input terminal to which a first signal is inputted at a timing when the signal output circuit generates an output signal and a delay circuit for delaying the inputted first signal in accordance with the setting value of the second setting terminal. With this configuration, the re-reflection can be easily prevented by setting the delay time of the delay circuit to, for example, the round-trip time in the transmission path.

Also, the signal transmission circuit as described above is effectively applied to, for example, a write circuit of a magnetic storage device. More specifically, since the reflection of a signal usually occurs at a magnetic head functioning as a signal receiver circuit in the write circuit of a magnetic storage device, problems such as the data write error and reduction of write speed occur when the re-reflection of a signal occurs. For its prevention, by using the signal transmission circuit as described above, such problems can be solved and it becomes possible to prevent the re-reflection without changing the circuit design even in the case where the characteristics of the transmission path are changed.

In addition, the means for outputting correction current mentioned above can be provided in the signal output circuit. By doing so, it is possible to realize the signal output circuit compatible with both the transmission path and the signal receiver circuit each having different characteristics.

Furthermore, the above-described method for preventing the re-reflection can be widely applied as a termination method for improving the waveform quality to a standard transmission system provided with, for example, a driver circuit, a receiver circuit, and a bus.

The effect obtained by the representative one of the inventions disclosed in this application will be briefly described as follows.

(1) In a signal transmission circuit, by providing means for outputting correction current to a transmitting node of a signal output circuit, it becomes possible to prevent the re-reflection of a signal at the transmitting node even when the impedance of the signal output circuit does not match the impedance of the transmission path.

(2) As a result of (1), the waveform quality at the receiving node is improved. Therefore, it is possible to prevent the error while receiving signal and to increase the receiving rate.

(3) Since the current amount and timing of correction current can be optionally changed, it is possible to flexibly cope with the signal transmission circuit having different impedance characteristics and length of transmission path.

(4) As a result of (3), it becomes unnecessary to redesign the signal output circuit for each signal transmission circuit. Therefore, it is possible to reduce the number of process steps, the design cost, and the manufacturing cost.

BRIEF DESCRIPTIONS OF THE DRAWINGS

FIG. 3 is a current waveform diagram showing an example of an operation waveform of the signal transmission circuit in FIG. 2 according to an embodiment of the present invention, in which

FIG. 6 is a diagram showing a configuration example of a magnetic storage device to which the signal transmission circuit according to an embodiment of the present invention is applied, in which

FIG. 8 is a current waveform diagram showing an example of an operation waveform of the signal transmission circuit in FIG. 7 in the conventional technique examined as a premise of the present invention, in which

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
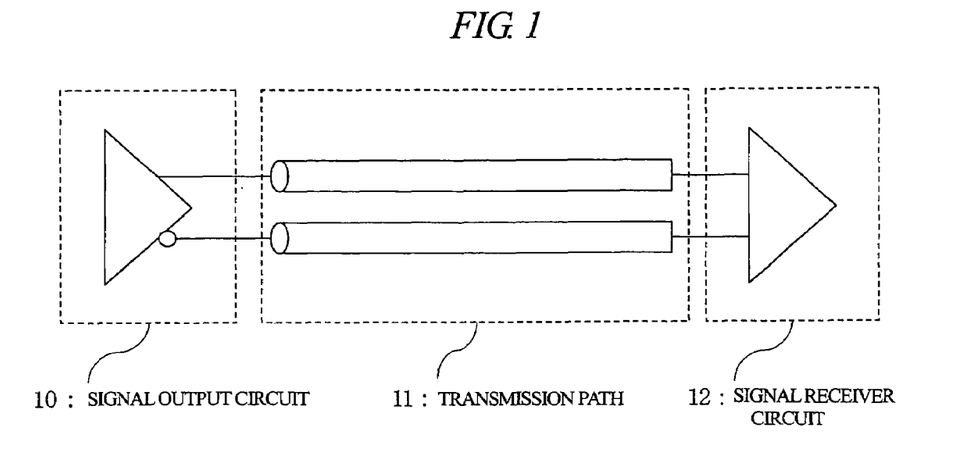
FIG. 1 is a schematic diagram showing a configuration example of a signal transmission circuit according to an embodiment of the present invention.

FIG. 1 is a schematic diagram showing a configuration example of a signal transmission circuit according to an embodiment of the present invention. The signal transmission circuit shown in FIG. 1 is composed of, for example, a signal output circuit 10 for outputting a signal, a transmission path 11 for transmitting the signal outputted from the signal output circuit 10, and a signal receiver circuit 12 for receiving the signal transmitted through the transmission path 11. Although the signal outputted from the signal output circuit 10 may be a voltage signal or a current signal, the case of the current signal will be shown hereinafter.

Figure 2:
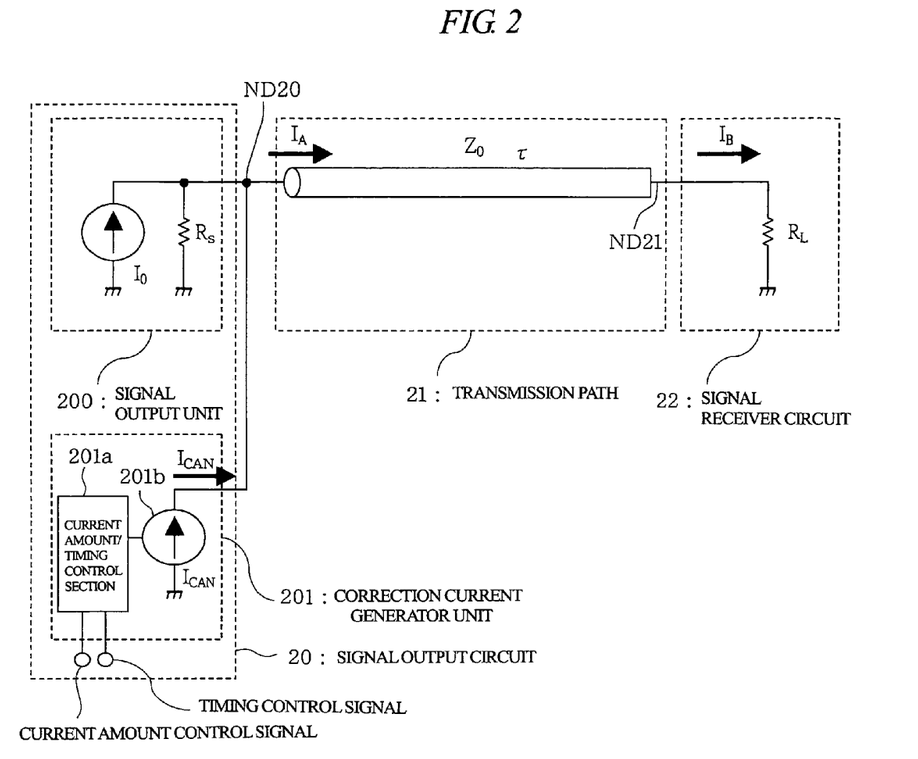
FIG. 2 is a diagram of an equivalent circuit representing an example of the circuit configuration of the signal transmission circuit according to an embodiment of the present invention.

The circuit configuration of the signal transmission circuit of FIG. 1 is shown in FIG. 2. FIG. 2 shows an equivalent circuit representing an example of the circuit configuration of the signal transmission circuit according to an embodiment of the present invention. The signal transmission circuit shown in FIG. 2 is composed of, for example, a transmission path 21 having a characteristic impedance of $Z_o$ and a transmission delay time $\tau$, a signal output circuit 20 connected to a transmitting node ND20 of the transmission path 21, and a signal receiver circuit 22 connected to a receiving node ND21 of the transmission path 21 and having an impedance $R_L$.

The signal output circuit 20 includes a signal output unit 200 and a correction current generator unit 201. The signal output unit 200 has an impedance $R_S$ and outputs a current signal $I_O$ to the receiving node ND20 of the transmission path 21. A timing control signal and a current amount control signal are inputted to the correction current generator unit 201, and the correction current generator unit 201 is composed of, for example, a current amount/timing control section 201a for processing these control signals and a current source 201b for outputting the correction current $I_{CAN}$ to the transmitting node ND20 of the transmission path 21 at the timing and with the current amount based on the processing result.

The operation of the signal transmission circuit with the above-described configuration is as follows. First, the signal output unit 200 outputs the current signal $I_O$. Then, a current signal $I_A$ which is a part of the current signal $I_O$ is inputted to the transmission path 21. The current signal $I_A$ is transmitted through the transmission path 21 to the signal receiver circuit 22 in a transmission delay time $\tau$. In this case, if the impedance $R_L$ of the signal receiver circuit 22 does not match the characteristic impedance $Z_O$ of the transmission path 21, reflection current to the current signal $I_A$ is generated at the receiving node ND21 of the transmission path 21.

This reflection current reaches the transmitting node ND20 of the transmission path 21 in the transmission delay time $\tau$. At this time, the correction current generator unit 201 outputs the correction current $I_{CAN}$ for preventing the re-reflection of the reflection current at the transmitting node ND20. In this manner, it is possible to prevent the re-reflection of the reflection current at the transmitting node ND20 of the transmission path 21 even when the impedance $R_S$ of the signal output unit 200 does not match the characteristic impedance $Z_O$ of the transmission path 21.

By the way, when generating the correction current $I_{CAN}$ in the correction current generator unit 201, it is necessary to determine the timing for generating the current and the current amount thereof. As is understood from the description above, the timing of generating the correction current is at the point when the time $2\tau$ equivalent to the round-trip time of the current signal $I_O$ has passed from the generation thereof in the signal output unit 200. Therefore, for example, the timing control signal is inputted to the current amount/timing control section 201a at the time when the signal output unit 200 outputs the current signal $I_O$ and the correction current is generated in the current amount/timing control section 201a after the delay time of $2\tau$ has passed.

Also, the current amount to be generated is determined depending on the current signal $I_O$ and the impedances of the signal output unit 200, the transmission path 21, and the signal receiver circuit 22. More specifically, in the configuration shown in FIG. 2, the current amount is determined as follows.

First, when the signal output unit 200 outputs the current signal $I_O$, current $I_1$ passing into the transmitting node ND20 of the transmission path 21 is expressed by the following expression.

$$I_1 = R_S/(R_S+Z_O) \times I_O \qquad (1)$$

This current $I_1$ is transmitted to the receiving node ND21 of the transmission path 21 in the transmission delay time $\tau$. At this time, the reflection current $I_{R1}$ expressed by the following expression is generated at the receiving node ND21.

$$I_{R1} = I_1 \times S_L \qquad (2)$$

Note that $S_L$ is a reflection coefficient of current at the receiving node ND21 and is expressed by the following expression.

$$S_L = -(R_L - Z_O)/(R_L + Z_O) \qquad (3)$$

This reflection current $I_{R1}$ is transmitted to the transmitting node ND20 of the transmission path 21 in the transmission delay time $\tau$. Assuming that the reflection coefficient of the transmitting node ND20 is $S_S$, the re-reflection current $I_{R2}$ expressed by the following expression is generated at the transmitting node ND20 under ordinary circumstances.

$$I_{R2} = I_{R1} \times S_S \quad (4)$$

$$S_S = -(R_S - Z_O)/(R_S + Z_O) \quad (5)$$

Then, by passing the correction current $I_{CAN}$ for canceling the re-reflection current $I_{R2}$, the re-reflection of the current can be prevented. The correction current $I_{CAN}$ can be expressed as follows.

$$I_{CAN} = -I_{R2} \quad (6)$$

Therefore, the current amount of the expression (6) is set in the current amount/timing control section 201a by using, for example, the current amount control signal.

Figure 3A:
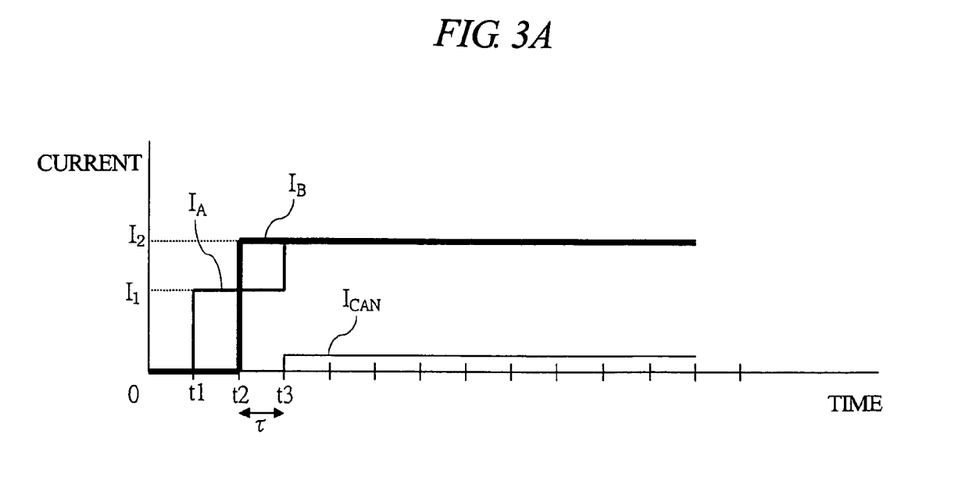
FIG. 3A shows the case of Rs>Zo and FIG. 3B shows the case of Rs<Zo.
Figure 3B:
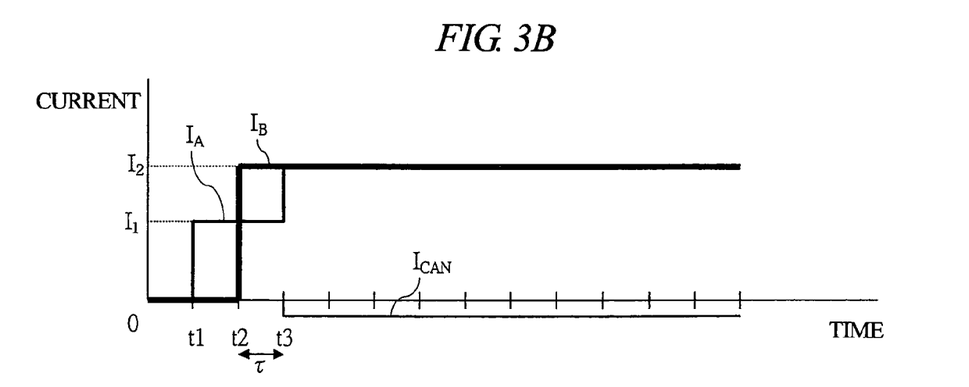

As described above, by outputting the correction current $I_{CAN}$ after setting the timing and current amount thereof, the current signal can be stably supplied to the signal receiver circuit 22 as shown in FIG. 3. FIG. 3 is a current waveform diagram showing an example of an operation waveform of the signal transmission circuit of FIG. 2 according to an embodiment of the present invention, in which FIG. 3A shows the case of Rs>Zo and FIG. 3B shows the case of Rs<Zo.

The waveform diagrams in FIGS. 3A and 3B show the case where the impedance $R_L$ of the signal receiver circuit 22 is much lower than the characteristic impedance $Z_O$ of the transmission path 21, and the current waveform $I_A$ at the transmitting node ND20 of the transmission path 21, the current waveform $I_B$ at the receiving node ND21 of the transmission path, and the waveform of the correction current $I_{CAN}$ in the correction current generator unit 201 are shown therein.

In FIG. 3A, when the current signal $I_O$ is generated in the signal output unit 200, the current waveform $I_A$ at the transmitting node ND20 of the transmission path 21 becomes the current $I_1$ at the time t=t1. Then, after the transmission delay time τ, the current $I_1$ is transmitted to the receiving node ND21 of the transmission path 21. At the receiving node ND21, the reflection current to the current $I_1$ is generated after passing the time τ from the time t1, that is, at the time t=t2. Therefore, the current waveform $I_B$ at the receiving node ND21 becomes the current $I_2$ at t=t2 because the reflection current is added to the current $I_1$.

Then, this reflection current is transmitted to the input of the transmission path and reaches the transmitting node ND20 of the transmission path 21 after passing the time 2τ from the time t1, that is, at the time t=t3. At this time, the correction current $I_{CAN}$ is supplied to the transmitting node ND20 by the correction current generator unit 201. In this manner, the re-reflection can be prevented and the current waveform $I_A$ becomes the current $I_2$ which is equivalent to the current waveform $I_B$. Therefore, since the re-reflection at the receiving node ND20 can be prevented, the stable current waveform $I_B$ is supplied to the signal receiver circuit 22.

Also in FIG. 3B, the current waveform shows the behavior similar to that in FIG. 3A. However, the direction of the correction current $I_{CAN}$ at the time t=t3 differs in FIG. 3B. In this case, the correction current generator unit 201 absorbs the correction current $I_{CAN}$ at the transmitting node ND20.

As described above, by using the signal transmission circuit including the signal output circuit 20 having the correction current generator unit 201 as shown in FIG. 2, following effects can be achieved.

(1) Even when the impedance $R_S$ of the signal output unit does not match the characteristic impedance $Z_O$ of the transmission path, the re-reflection at the transmitting node of the transmission path can be prevented. Therefore, it is possible to supply a stable signal to the signal receiver circuit.

(2) It becomes possible to prevent the operation error of the signal receiver circuit and also to achieve the high-speed operation of the signal receiver circuit. More specifically, when ringing occurs in the current signal due to the multiple reflection at the transmitting node and the receiving node, the signal receiver circuit is not operated until the ringing is removed in some cases in order to prevent the operation error. In such a case, by using the configuration shown in FIG. 2, the ringing can be prevented and the problem due to the ringing can be also solved.

(3) It is possible to realize a signal output circuit compatible with a plurality of transmission paths each having different characteristic impedances.

Note that the configuration in which the correction current generator unit is provided in the signal output circuit has been shown in FIG. 2. However, the present invention is not limited to this and it is also possible to provide a correction signal generator unit as means for terminating the transmitting node of the transmission path on the signal transmission circuit. By doing so, the signal output circuit and the transmission path can be combined regardless of their impedance characteristics, and thus, it is possible to improve the flexibility in the establishment of the signal transmission circuit.

Next, more detailed configuration example of the correction current generator unit 201 shown in FIG. 2 will be described. As described above, the correction current generator unit 201 has a function to set the correction current amount, a function to set the timing of generating the correction current, and a function to actually output the correction current based on these settings.

In this case, it is preferable that the correction current amount and the generation timing can be variably set to optional values so as to be compatible with the signal transmission circuit with various characteristics. In the variable setting, for example, there are the analog setting and the digital setting, and various circuits corresponding to each case are available. Some examples of these circuits are shown in FIGS. 4 and 5.

Figure 4:
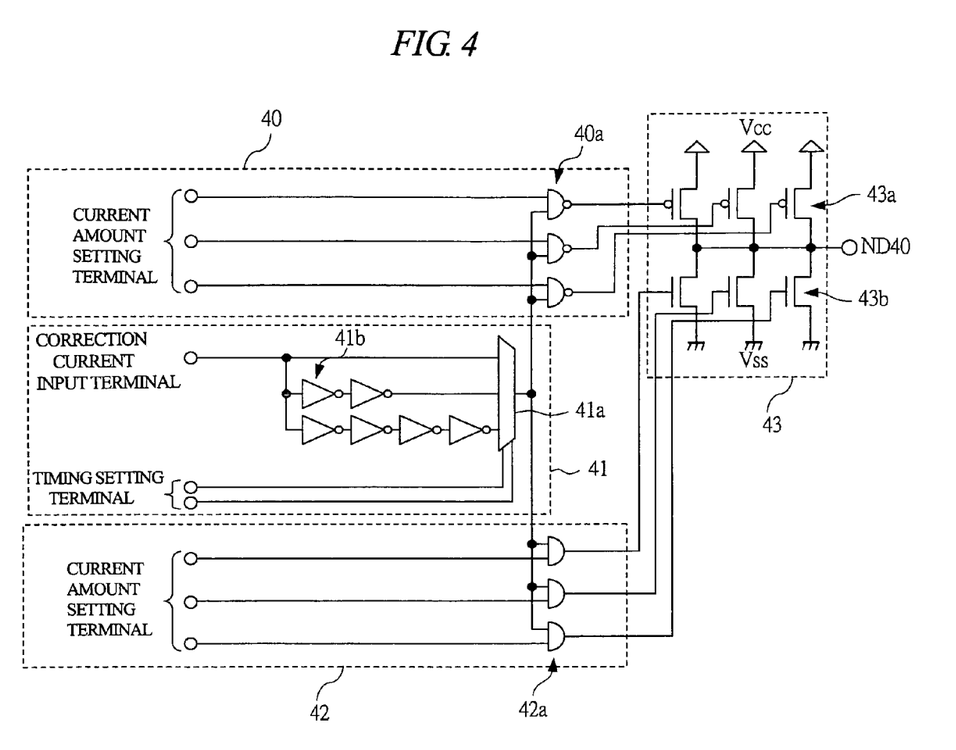
FIG. 4 is circuit diagram showing a configuration example of a correction current generator unit in the signal transmission circuit according to an embodiment of the present invention.
Figure 5:
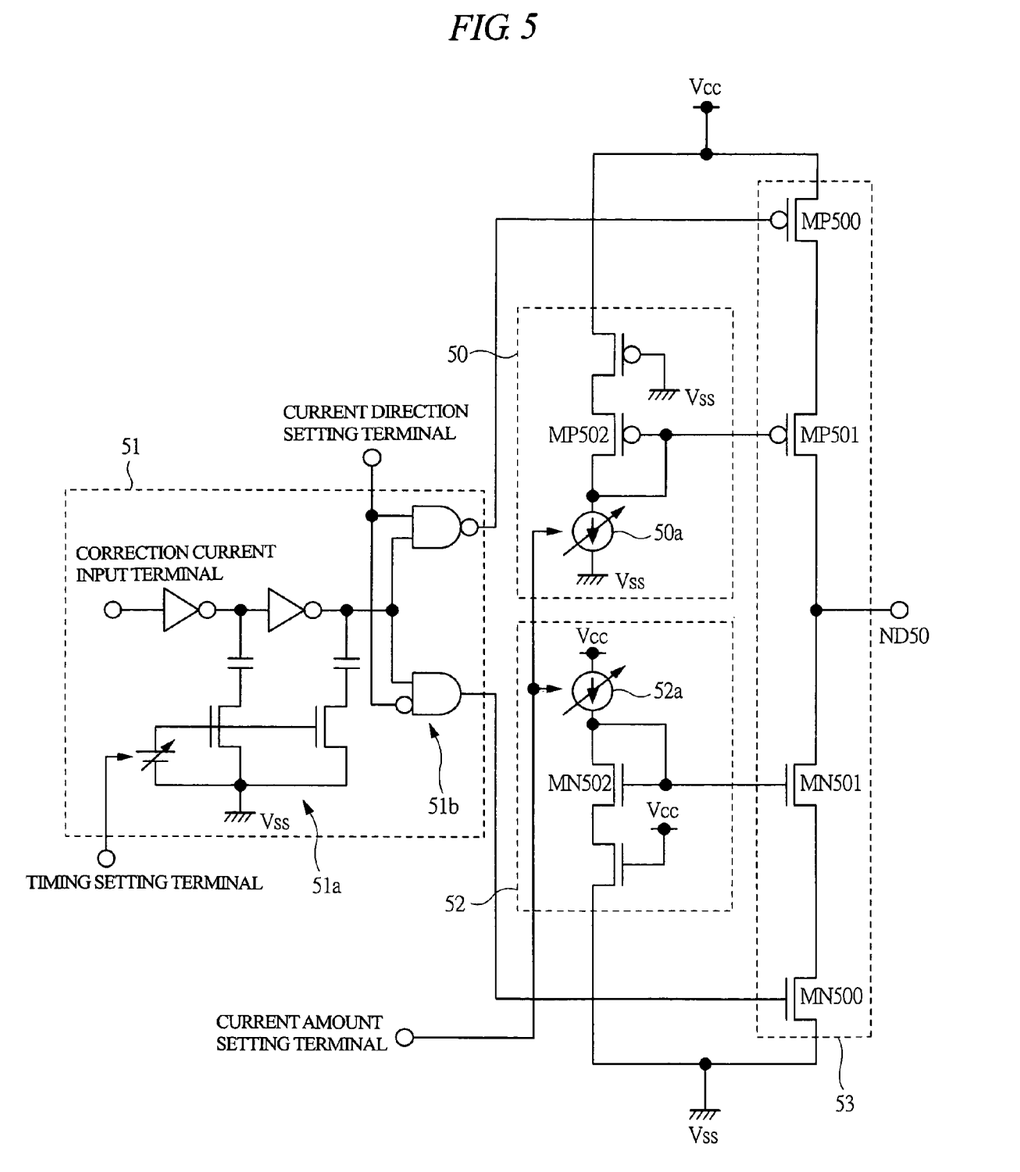
FIG. 5 is a circuit diagram showing another configuration example of the correction current generator unit different from that of FIG. 4 in the signal transmission circuit according to an embodiment of the present invention.

FIG. 4 is a circuit diagram showing a configuration example of the correction current generator unit in the signal transmission circuit according to an embodiment of the present invention. FIG. 5 is a circuit diagram showing another configuration example of the correction current generator unit different from that of FIG. 4 in the signal transmission circuit according to an embodiment of the present invention. The circuit shown in FIG. 4 is used for the digital setting, and the circuit shown in FIG. 5 is used for the analog setting.

The correction current generator unit shown in FIG. 4 is composed of, for example, a correction current amount setting sections (1) 40 and (2) 42, a timing setting section 41, a correction current output section 43, and the like. The correction current output section 43 is composed of, for example, a plurality of P channel MOS transistors (hereinafter, referred to as PMOS transistor) 43a provided between power supply terminals Vcc and a transmitting node ND40 and connected in parallel and a plurality of N channel MOS transistors (hereinafter, referred to as NMOS transistor) 43b provided between the transmitting node ND40 and reference potential terminals Vss and connected in parallel. In this configuration, the PMOS transistors 43a supply the correction current to the transmitting node ND40 and the NMOS transistors 43b absorb the correction current from the transmitting node ND40.

The correction current setting section (1) 40 includes, for example, a plurality of NAND circuits 40a whose outputs are connected to the gate terminals of the plurality of PMOS transistors 43a, and one inputs of the plurality of NAND circuits 40a are connected to the current amount setting terminals (first setting terminal) and the other inputs thereof are connected to an output signal from the timing setting section 41. Similarly, the correction current setting section (2) 42 includes, for example, a plurality of AND circuits 42a whose outputs are connected to the gate terminals of the plurality of NMOS transistors 43b, and the inputs thereof are connected to the current amount setting terminals and an output signal from the timing setting section 41.

More specifically, by the settings from the current amount setting terminals, the MOS transistors to be driven and the number thereof can be optionally selected from among the plurality of PMOS transistors 43a and NMOS transistors 43b, and the supply amount and the absorption amount of the correction current can be flexibly adjusted. Then, the selected MOS transistors are driven by the output signal from the timing setting section 41 so as to output the correction current.

The timing setting section 41 includes, for example, a correction current input terminal (first input terminal), a selector 41a, multiple systems of delay paths 41b provided between the correction current input terminal and the selector 41a and in which the delay time is changed by inverter circuits, and timing setting terminals (second setting terminal) for inputting the selection signal of the selector 41a. The control signal (first signal) in the output stage of the signal output unit 200 in FIG. 2 is inputted to the correction current input terminal. That is, the correction current input terminal is connected so as to divide the output of the driver stage (not shown) for driving the gate of the output transistor in the signal output unit 200. Therefore, the signal (first signal) of the correction current input terminal rises at the almost same timing as the output of the signal by the signal output unit 200. Since the delay path 41b is selected by the timing setting terminal, after the signal (first signal) is inputted to the correction current input terminal, the output signal can be generated after the delay time of the selected delay path has passed. In this case, the delay time set in the timing setting terminal is, for example, equal to twice the transmission delay time τ of the transmission path 21 in FIG. 2.

On the other hand, the correction current generator unit shown in FIG. 5 is composed of, for example, correction current amount setting sections (11) 50 and (22) 52, a timing setting section 51, a correction current output section 53, and the like. The correction current output section 53 includes, for example, two PMOS transistors MP500 and MP501 connected in series provided between the power supply terminal Vcc and the transmitting node ND50 and supplying the correction current to the transmitting node ND50 and two NMOS transistors MN500 and MN501 connected in series provided between the transmitting node ND50 and the reference potential terminal Vss and absorbing the correction current from the transmitting node ND50.

The PMOS transistor MP500 has a function to control the ON/OFF of the supply of the correction current, and the PMOS transistor MP501 has a function to set the correction current amount to be supplied by the gate voltage value thereof. Similarly, the NMOS transistor MN500 has a function to control the ON/OFF of the absorption of the correction current, and the NMOS transistor MN501 has a function to set the correction current amount to be absorbed.

The correction current amount setting section (11) 50 includes, for example, a variable current source 50a having a current amount setting terminal (first setting terminal) and a diode-connected PMOS transistor MP502, and it forms a current mirror circuit in combination with the PMOS transistor MP501 of the correction current output section 53. More specifically, it is possible to determine the correction current amount to be supplied to the transmitting node ND50 by setting the current amount of the variable current source 50a by the current amount setting terminal.

The correction current amount setting section (22) 52 includes, for example, a variable current source 52a having a current amount setting terminal and a diode-connected NMOS transistor MN502, and it forms a current mirror circuit in combination with the NMOS transistor MN501 of the correction current output section 53. More specifically, it is possible to determine the correction current amount to be absorbed from the transmitting node ND50 by setting the current amount of the variable current source 52a by the current amount setting terminal.

The timing setting section 51 is composed of, for example, a delay circuit 51a, a current direction setting circuit 51b connected to an output of the delay circuit 51a, and the like. The delay circuit 51a includes, for example, a plurality of inverter circuits connected in series from the correction current input terminal (first input terminal), capacitors and NMOS transistors provided between the output of each inverter circuit and the reference potential terminal Vss. In this delay circuit 51a, the delay time can be adjusted by controlling the gate voltage of the NMOS transistors by the timing setting terminal (second setting terminal). The current direction setting circuit 51b includes, for example, a NAND circuit and an AND circuit connected to the output of the delay circuit 51a and the current direction setting terminal (first setting terminal), and the outputs thereof are connected to the PMOS transistor MP500 and the NMOS transistor MN500.

More specifically, the current direction setting terminal and the current amount setting terminal select the supply and the absorption of the correction current and set the current amount thereof, and the timing setting terminal sets the delay time. Then, when the reference signal (first signal) is inputted to the correction current input terminal at the timing when the signal output unit 200 in FIG. 2 outputs the signal, either of the PMOS transistor MP500 or the NMOS transistor MN500 is turned from an OFF state to an ON state after the set delay time has passed, and the correction current is supplied or absorbed.

As described above, by using the correction current generator unit shown in FIGS. 4 and 5, it becomes possible to optionally set the supply amount and the absorption amount of the correction current and the timing of generating the correction current from outside. Therefore, by using the circuits as described above, it becomes possible to combine the signal output circuit and the transmission path each having different impedances by the settings from outside without changing the circuit design. Note that the correction current generator unit is not limited to the circuit configuration example shown in FIGS. 4 and 5, and other generally known delay circuit and current amount setting circuit are also available.

Figure 6A:
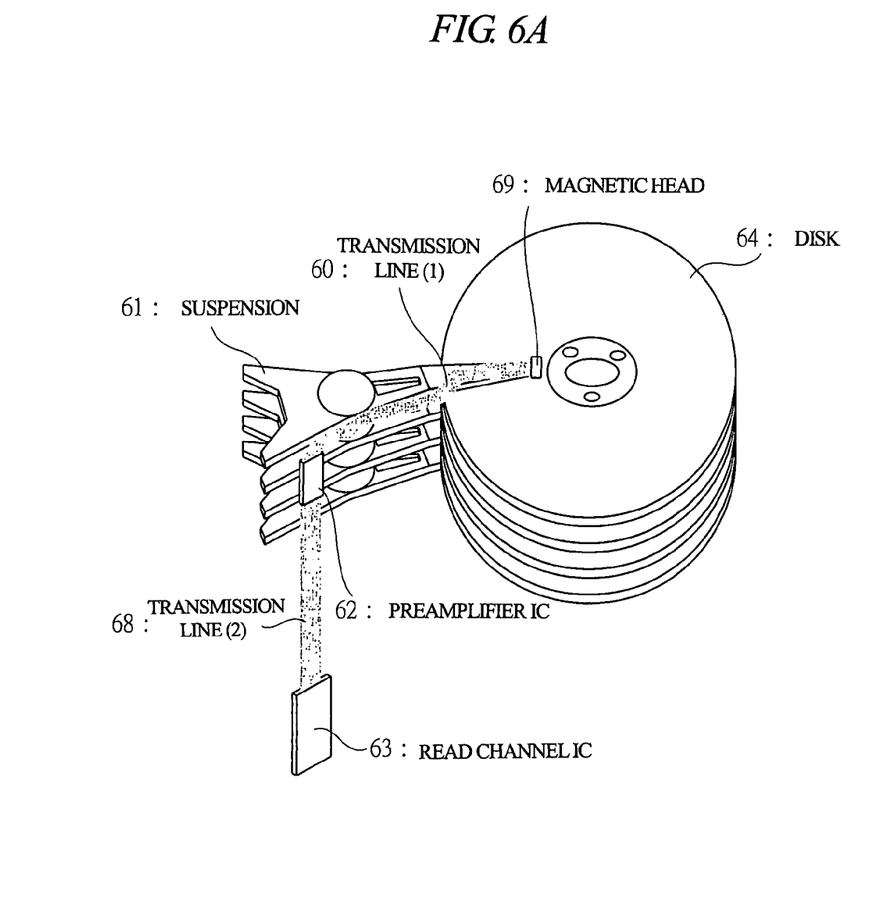
FIG. 6A is a perspective view showing an external appearance thereof and FIG. 6B is a block diagram showing an example of the circuit configuration thereof.
Figure 6B:
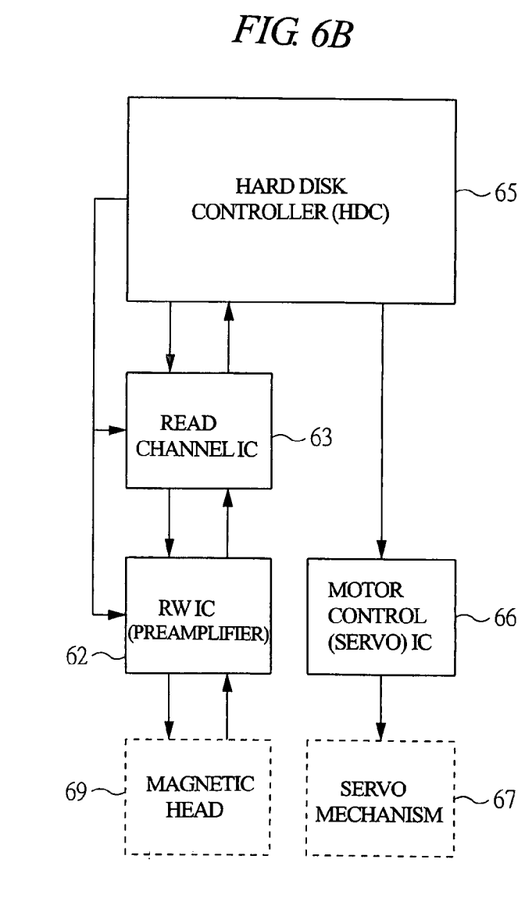

In addition, the signal transmission circuit described above is effectively applied to a write circuit in a magnetic storage device shown in FIG. 6. FIG. 6 shows a configuration example of a magnetic storage device in which the signal transmission circuit according to an embodiment of the present invention is applied, in which FIG. 6A is a perspective view showing an external appearance and FIG. 6B is a block diagram showing an example of the circuit configuration thereof.

The magnetic storage device shown in FIG. 6 is, for example, a hard disk drive. As shown in FIG. 6A, it includes a disk 64 having magnetic anisotropy in a vertical or horizontal direction, a magnetic head 69 which writes or reads magnetic data to/from the disk 64, a suspension 61 having the magnetic head 69 fixed thereto and moving the magnetic head 69 on the disk 64 in accordance with the location for storing the data, a preamplifier IC 62 connected via a transmission line (1) 60 to the magnetic head 69 and mounted on the suspension 61, and a read channel IC 63 connected via a transmission line (2) 68 to the preamplifier IC 62.

Also, FIG. 6B shows a block diagram of the circuit for controlling the above-described magnetic storage device, which includes a hard disk controller (HDC) 65 constituting an interface between the magnetic storage device and a host system (personal computer or digital equipment) and controlling the transmission of read/write data, a read channel IC 63 for performing signal processing such as data modulation/demodulation, an RW_IC (preamplifier IC) 62 provided with a circuit for supplying current to the magnetic head 69 so as to write data and a circuit for amplifying the signal read by the magnetic head 69, and a motor control (servo) IC 66 for controlling a servo mechanism 67 such as an operating mechanism of the suspension 61 and a rotating mechanism of the disk 64.

In the configuration of this magnetic storage device, the signal transmission path described above can be effectively applied to a date write circuit composed of the preamplifier IC (signal output circuit) 62, the transmission line (1) (transmission path) 60, and the magnetic head (signal receiver circuit) 69.

More specifically, the impedance of the magnetic head 69 is usually lower than the characteristic impedance of the transmission line (1) 60. Also, the characteristic impedance in the transmission line (1) 60 may be changed depending on the difference of the magnetic storage devices. Therefore, it is necessary to redesign the preamplifier IC 62 for each of the magnetic storage devices in the conventional technique. However, by using the signal transmission circuit as described above, the redesign of the preamplifier IC 62 becomes unnecessary.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the description above, the case where the signal output circuit is driven by current has been described. However, even in the case where the signal output circuit is driven by voltage, the re-reflection can be prevented by outputting the correction current for canceling the re-reflection current due to the re-reflection voltage.

The signal transmission circuit, the signal output circuit, and the termination method of the signal transmission circuit in the present invention can be effective applied, as a method of preventing the re-reflection, to a system such as a write circuit to a magnetic head in a hard disk drive, in which reflection occurs at the signal receiving node. In addition, the application thereof is not limited to this, and it can be widely applied as a termination method of, for example, the normal transmission system in which a driver circuit and a receiver circuit are connected on a bus.

What is claimed is:

1. A signal transmission circuit, comprising:
   a transmission path;
   a signal output circuit connected to a transmitting node of said transmission path; and
   a signal receiver circuit connected to a receiving node of said transmission path,
   wherein circuit means for outputting correction current to said transmitting node is provided in order to prevent re-reflection of an output signal of said signal output circuit at said transmitting node, the output signal having been reflected at said receiving node, and
   wherein said circuit means has a first function to set a current amount of said correction current in accordance with a first setting value input to a first setting terminal and a second function to set an output timing of said correction current in accordance with a second setting value input to a second setting terminal.

2. The signal transmission circuit according to claim 1, wherein said current amount is the current amount capable of canceling current generated by said re-reflection, and
   wherein said output timing is the timing at which the output signal of said signal output circuit is re-reflected at said transmitting node.

3. The signal transmission circuit according to claim 1, wherein said second function to set the output timing comprises a delay circuit which delays a first signal input at a timing at which said signal output circuit generates said output signal in accordance with said second setting value input to the second setting terminal.

4. The signal transmission circuit according to claim 1, wherein said signal transmission circuit is applied to a write circuit of a magnetic storage device.

5. A signal output circuit connected to a transmitting node of a transmission path, comprising:
   said circuit means for outputting said correction current according to claim 1.

6. A termination method of a signal transmission circuit, said signal transmission circuit comprising:
   a transmission path;
   a signal output circuit connected to a transmitting node of said transmission path; and
   a signal receiver circuit connected to a receiving node of said transmission path,
   wherein circuit means for outputting correction current to said transmitting node is provided in order to prevent re-reflection of an output signal of said signal output circuit at said transmitting node, the output signal having been reflected at said receiving node, and
   wherein said circuit means sets a current amount of said correction current in accordance with a first setting value input to a first setting terminal, sets an output timing of said correction current in accordance with a second setting value input to a second setting terminal, and outputs the correction current with said current amount and at said output timing.

7. The termination method of a signal transmission circuit according to claim 6,
   wherein the current amount capable of canceling the current generated by said re-reflection is set when setting said current amount of correction current, and the timing at which said output signal of the signal output circuit is re-reflected at said transmitting node is set when setting said timing.

8. The termination method of a signal transmission circuit according to claim 6,
wherein the current amount corresponding to a plurality of signal transmission circuits each having different impedance characteristics is set by external setting when setting said current amount.

9. The termination method of a signal transmission circuit according to claim 6,
wherein the timing corresponding to a plurality of transmission paths each having different lengths is set by external setting when setting said timing.

10. A signal transmission circuit, comprising:
a transmission path;
a signal output circuit connected to a transmitting node of said transmission path; and
a signal receiver circuit connected to a receiving node of said transmission path,
wherein, in order to prevent re-reflection of an output signal of said signal output circuit at said transmitting node, the output signal having been reflected at said receiving node, means for outputting correction current to said transmission node with a set current amount capable of canceling current generated by said re-reflection and at a set output timing at which the output signal of said signal output circuit is re-reflected at said transmitting node is provided.

11. The signal transmission circuit according to claim 10,
wherein said means for outputting the correction current has a first setting terminal and a function that optionally changes said set current amount in accordance with a setting value of said first setting terminal.

12. The signal transmission circuit according to claim 10,
wherein said means for outputting the correction current has a second setting terminal and a function that optionally changes said set timing in accordance with a setting value of said second setting terminal.

13. The signal transmission circuit according to claim 12,
wherein said function that optionally changes said set timing has a first input terminal to which a first signal is input at a timing at which said signal output circuit generates said output signal and a delay circuit which delays said input first signal in accordance with the setting value of said second setting terminal.

14. The signal transmission circuit according to claim 10,
wherein said signal transmission circuit is applied to a write circuit of a magnetic storage device.

* * * * *